:::
United States Patent [19]

Reynolds

[11] Patent Number: 5,090,938
[45] Date of Patent: Feb. 25, 1992

[54] TOY OR OTHER OBJECT ALTERABLE BETWEEN TWO DIFFERENT SHAPES

[76] Inventor: Christopher Reynolds, Apt. 1204, 520 Brickell Key Dr., Miami, Fla. 33131

[21] Appl. No.: 675,732

[22] Filed: Mar. 27, 1991

[51] Int. Cl.$^5$ .......................... A63H 3/02; A63H 3/12; G09B 27/08
[52] U.S. Cl. ................................. 446/369; 446/321; 446/73; 434/133; 434/137
[58] Field of Search .................... 446/369, 321, 73, 74, 446/337, 339, 370, 371, 372, 385, 387, 388; 434/133, 137

[56] References Cited

U.S. PATENT DOCUMENTS

| | | | |
|---|---|---|---|
| D. 165,280 | 11/1951 | Goodman et al. | 434/133 X |
| 4,413,442 | 11/1983 | McSweeney | 446/369 X |
| 4,614,505 | 9/1986 | Schneider et al. | 446/369 X |
| 4,695,264 | 9/1987 | McLeod, Jr. | 446/369 X |
| 4,715,840 | 12/1987 | Swift | 446/369 X |
| 4,734,075 | 3/1988 | Park | 446/369 X |
| 4,842,565 | 6/1989 | Von Philp, Sr. | 446/369 X |

FOREIGN PATENT DOCUMENTS 938100 12/1973 Canada ................................ 434/137

Primary Examiner—David N. Muir
Attorney, Agent, or Firm—Arthur L. Plevy

[57] ABSTRACT

An object capable of having its shape altered has a first cloth-like material formed in a first predetermined shape, an aperture formed in the first material so that an internal hollow of the first shape can be accessed and a second pliable material positioned within the internal hollow and formed to assume a second predetermined shape. The second material is connected to the first material at the internal hollow so that the second material can be withdrawn from the internal hollow through the aperture. In this formation, the aperture is common to both the first and second materials. By extracting the second material from the aperture, the first material can be inserted or pushed through the aperture into the internal hollow, where eventually, the first material and shape are completely contained within the internal hollow and surrounded by the second material. Therefore, the first material and its shape become undetectable as the second material and shape are exposed. The user can manipulate the first and second materials indefinitely to continually change the shape of the object.

9 Claims, 7 Drawing Sheets

TOY OR OTHER OBJECT ALTERABLE BETWEEN TWO DIFFERENT SHAPES

FIELD OF THE INVENTION

This invention relates generally to toy objects and, more particularly, to toy objects that can be altered to assume different shapes.

BACKGROUND OF THE INVENTION

Known toys are formed of cloth-like, even plush material and are formed to assume different shapes. Among such shapes, animal shapes are well known.

Additionally, a child may eventually learn to associate the likeness of the toy object with its real namesake, if one does indeed exist, and to even understand where the object is geographically located upon the face of the Earth. However, this understanding usually requires information supplied from another source, such as a book, film or parent, for example.

The present invention enables an object, such as a toy, to be indefinitely alterable or reversed between two different shapes and provides the user with information pertaining to the entities represented by the different shapes.

SUMMARY OF THE INVENTION

The present invention is an object that can assume a completely different shape so that the original shape is undetectable. In particular, and as an example of the present invention, an object in the form of an animal shape can be manipulated to form a spherical shape, such as that of the globe, upon which the animal's likeness is manifested at a position to indicate where the animal can be found.

The present invention includes an object fabricated from a cloth or a like material which is formed in a predetermined shape. The material has an exterior aperture which provides access to an internal hollow of the object. A second piece of cloth-like material formed in a different, predetermined shape is attached to the first material within the internal hollow. The second material has a surface containing indicia manifesting a chosen pattern. By extracting the second material from the internal hollow, the first material can then be inserted into the internal hollow. This is because the aperture is common to both the first and second materials. When the second material is extracted, it assumes its predetermined shape with the chosen pattern exposed. Meanwhile, the first material and its original shape are manipulated to be inserted into the internal hollow. The end result is that the first material now exists within the internal hollow to support the second material and its different shape. After the first material has been inserted completely into the internal hollow, and the second material has been manipulated to completely surround the first material, the original shape of the first material is undetectable. The transformation between the two different shapes can be carried on indefinitely and is similar to inverting a sock or a glove. However, unlike the process of inverting a sock or a glove, which only results in a mirror-image of the previous shape, the present invention permits the user to manipulate the object indefinitely between two different shapes so that when the object is formed in one shape, the other shape is no longer discernable.

To return the object to its original animal shape, the existing surface material (now the second material) in the shape of a sphere is manipulated in the same manner as was the original shape.

It is therefore an object of the present invention to be alterable between an original shape and a different shape so that the original shape is no longer detectable.

It is another object of the present invention to provide a toy in a shape of an animal, which shape can be altered into a spherical shape having indicia representing the major land and water masses of the Earth, the animal shape being positioned on the Earth at its known geographic location.

It is a further object of the invention to have indicia manifesting those animals that are known to be endangered and protected species.

While reference is made to the animal shapes, it will be understood that different shapes, other than animals, can be used.

DETAILED DESCRIPTION OF THE DRAWINGS

Figure 1:
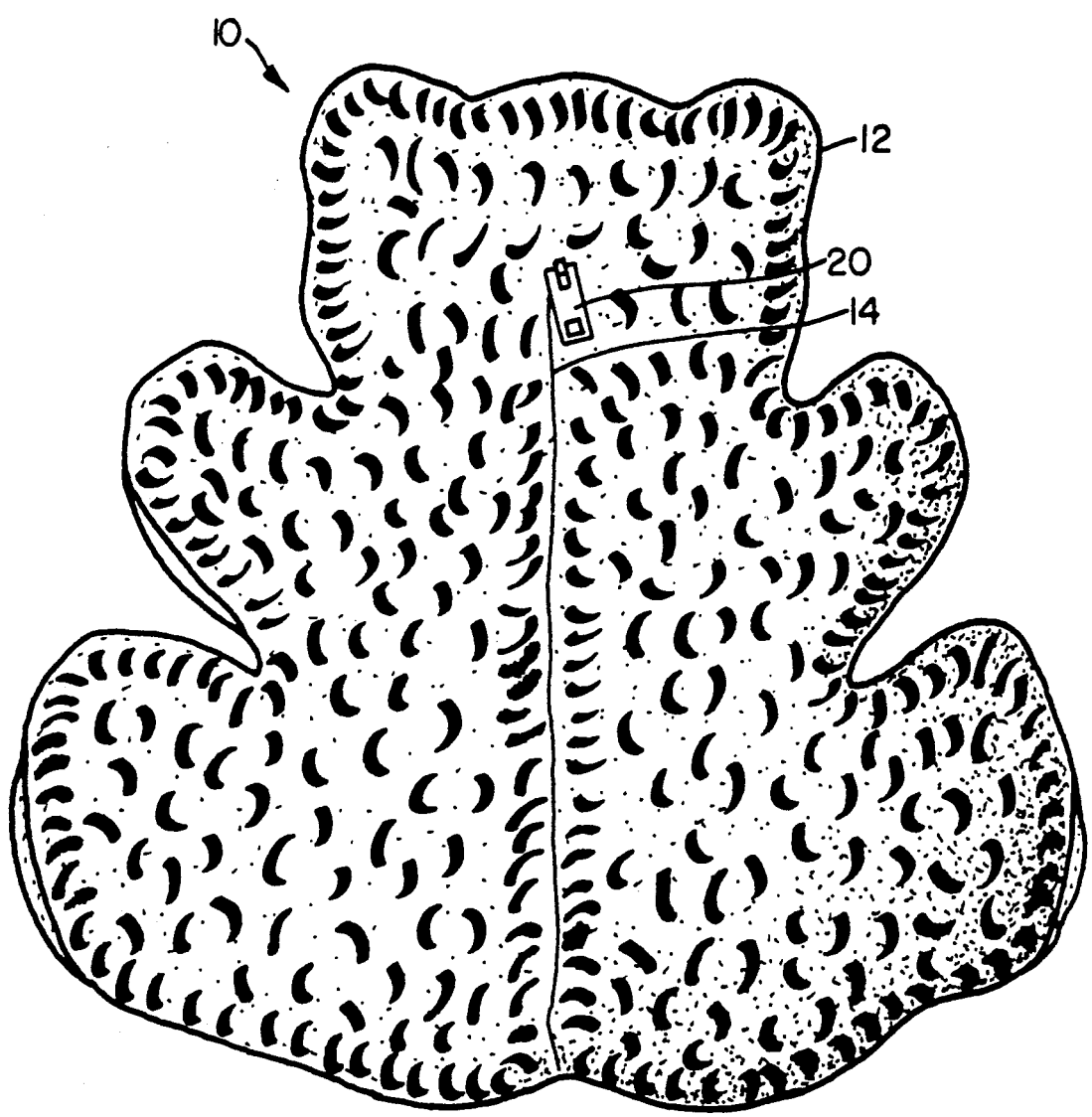
FIG. 1 is a rear view of an object formed with the present invention and being in a first shape.
Figure 2:
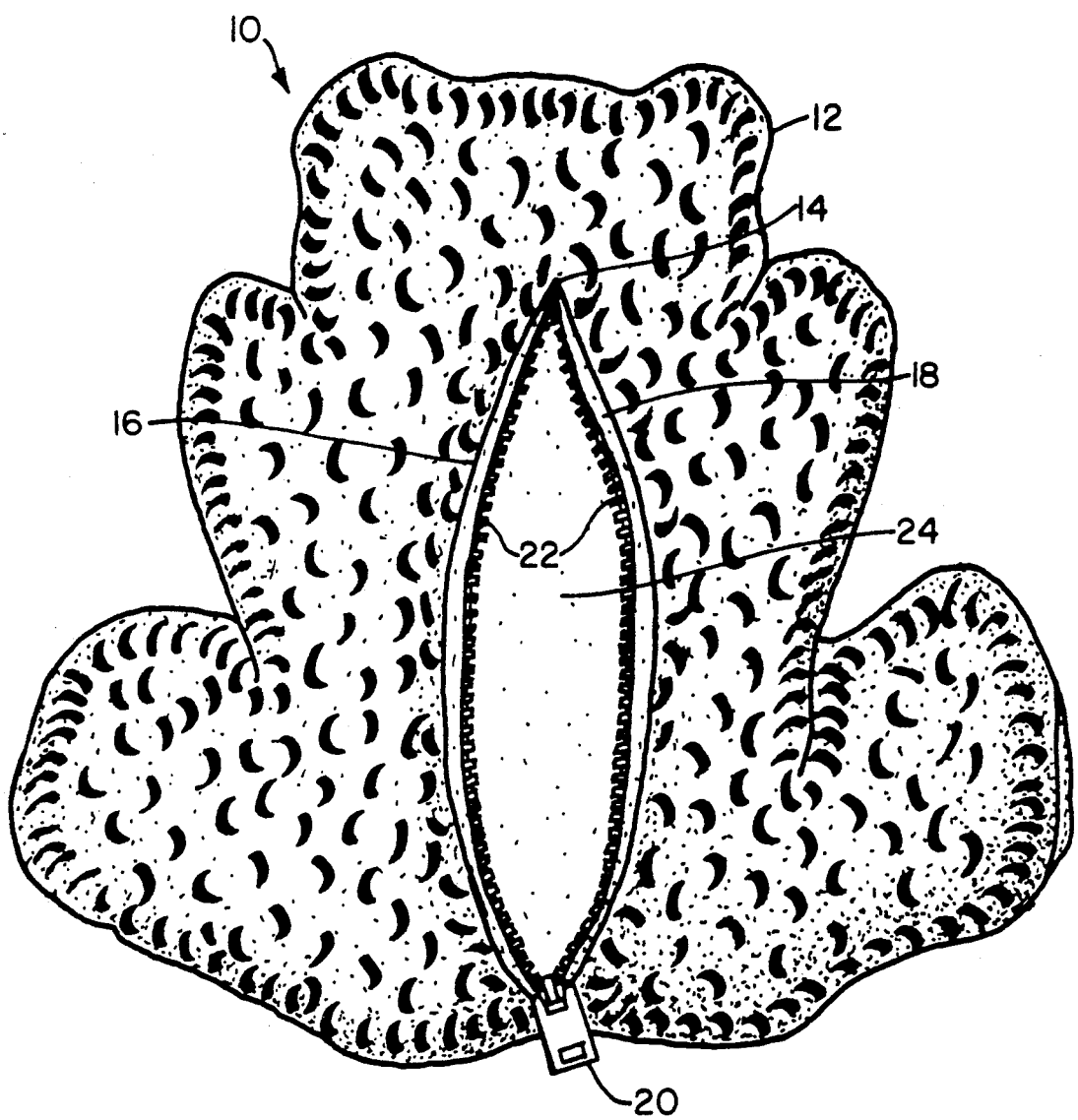
FIG. 2 is a rear view of the object in FIG. 1 showing the invention being used with the first shape.

Referring to FIGS. 1 and 2, there is shown an object 10 with the present invention formed therein. For purposes of an example, the object 10 is in the shape of an animal and is patterned with the particular likeness of a bear. However, any shape can be used. The object 10 is fabricated of a cloth-like surface material 12 that is pliable. The surface material 12 may also be plush and soft to the touch.

An aperture 14 is formed at the external surface of the material 12 and has a perimeter formed by two sides 16, 18. The aperture 14 provides for access to an internal hollow of the material 12, which internal hollow may be sealed by a closing mechanism 20 such as a zipper assembly, velcro tabs, etc.

A second cloth-like material 24 that is pliable and is formed in a different predetermined shape, in this example a sphere, is connected to the surface material 12 within the internal hollow. The second material 24 has a first surface 26 and a second surface (not shown). The second material 24 may be of a somewhat stiffer texture than the surface material 12.

Figure 3:
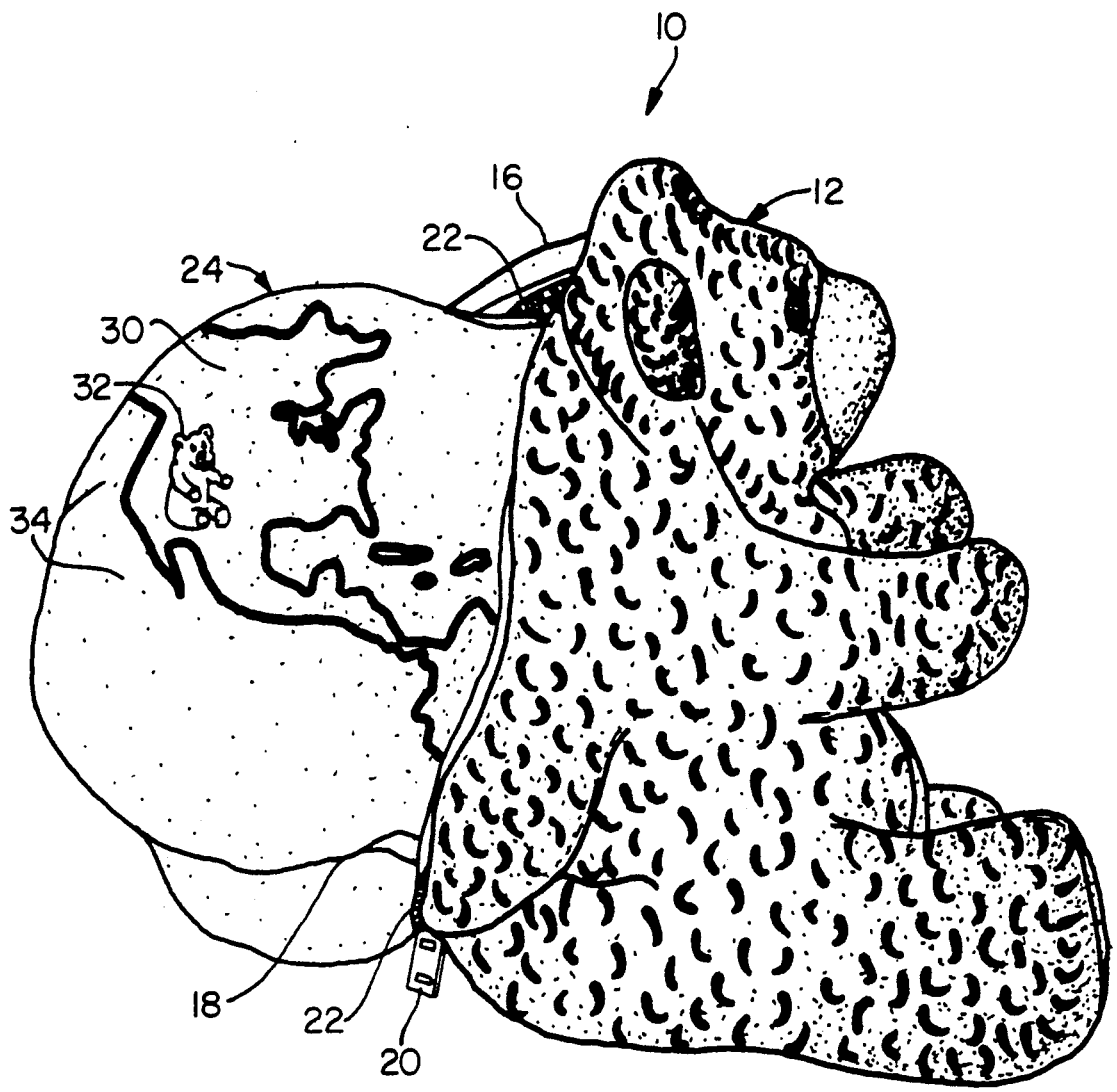
FIG. 3 is a side view of the object in FIGS. 1 and 2 being manipulated to alter the first shape into a second shape.
Figure 4:
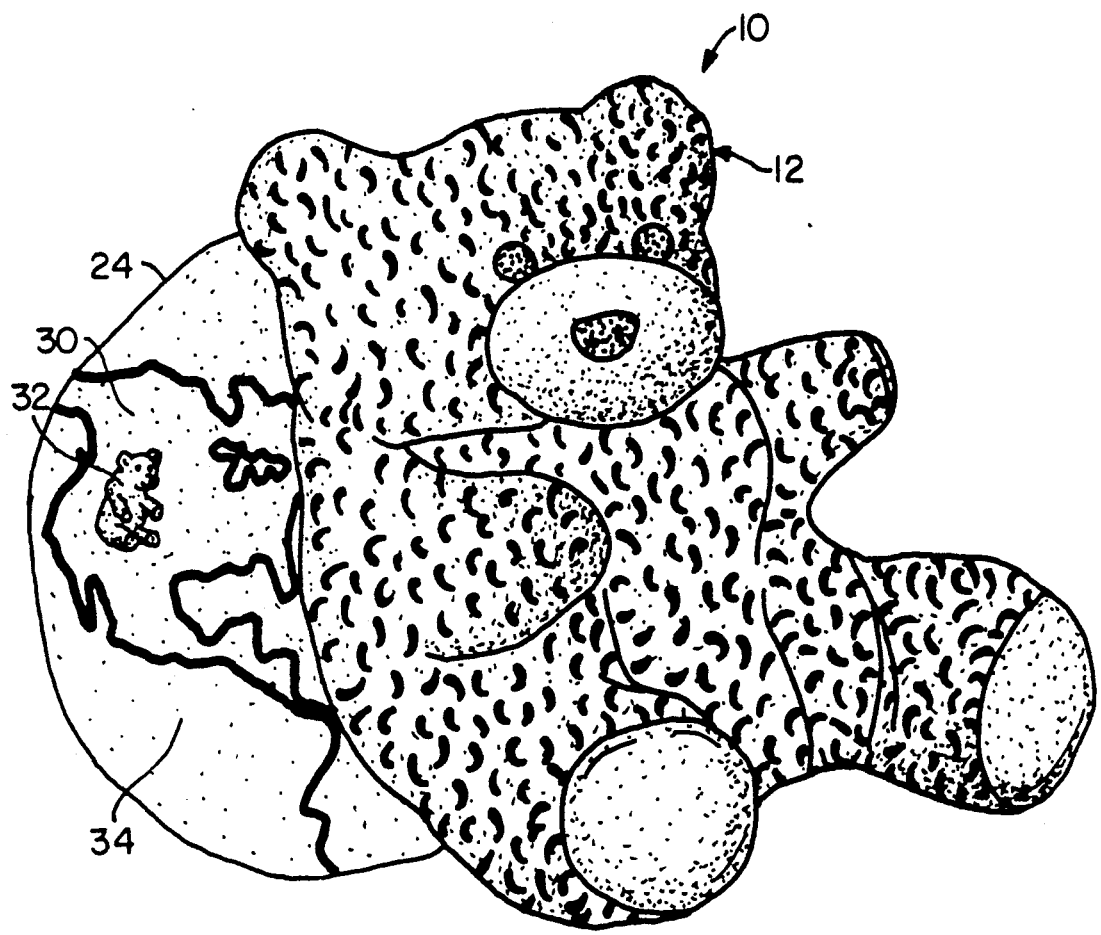
FIG. 4 is a perspective front view of the object in FIG. 3.
Figure 5:
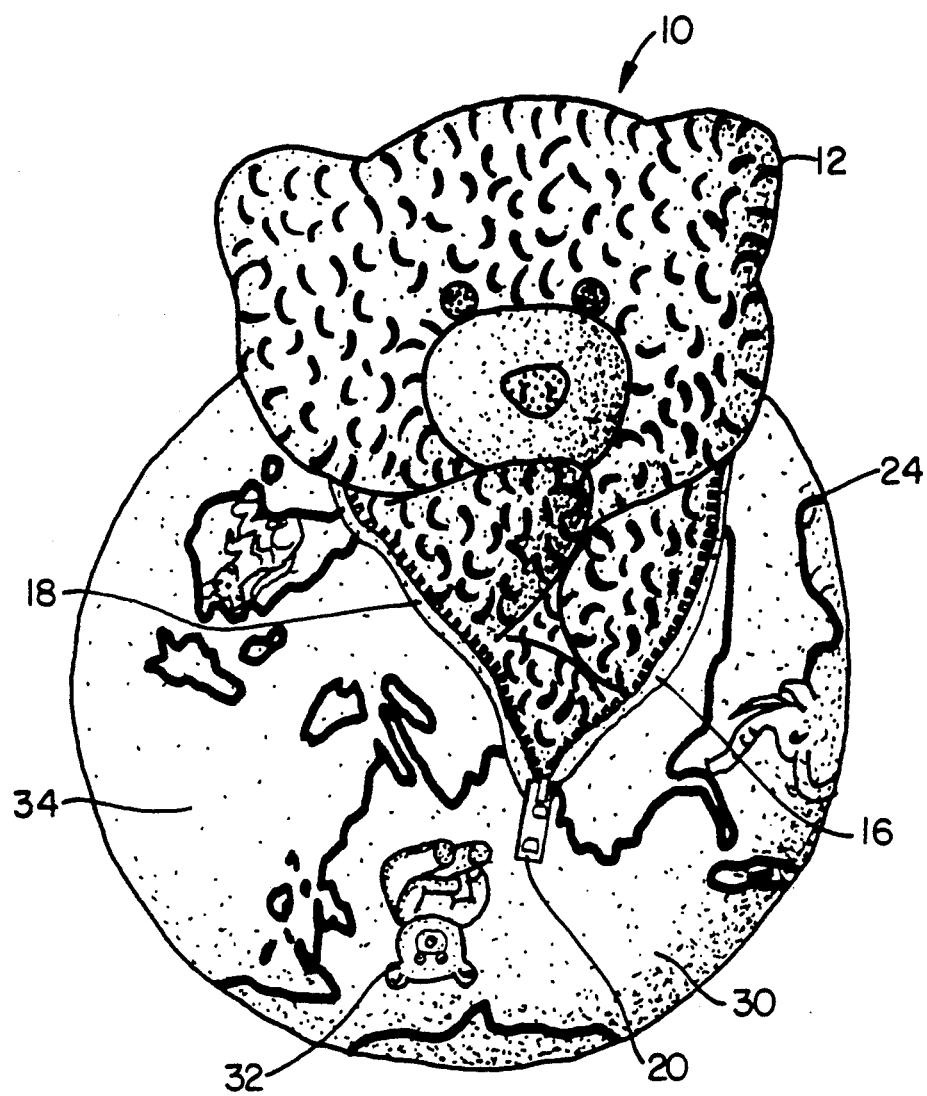
FIGS. 5 and 6 are views of the object being altered into the second shape by the present invention.

FIGS. 3, 4 and 5 show the side view (FIG. 3) and the front perspective view (FIG. 4) of the toy 10 as it is being manipulated to alter the animal shape into that of the sphere. To accomplish this, the user merely reaches through the aperture 14 and into the internal hollow to grasp the second material 24. The second material 24 is then pulled out of the internal hollow through the aperture 14 where it immediately begins to assume its predetermined shape, that of a sphere. Now that the second material 24 has been extracted from the internal hollow, the first or original surface material 12 can be inserted through the aperture 14 and into the internal hollow. By pushing all of the first material 12 through the aperture 14, the second material 24 assumes its own predetermined shape, such that the first material 12 and its shape (that of the animal) become less discernible (FIG. 5). Therefore, only the surface 26 of the second material 24 remains exposed.

Figure 6:
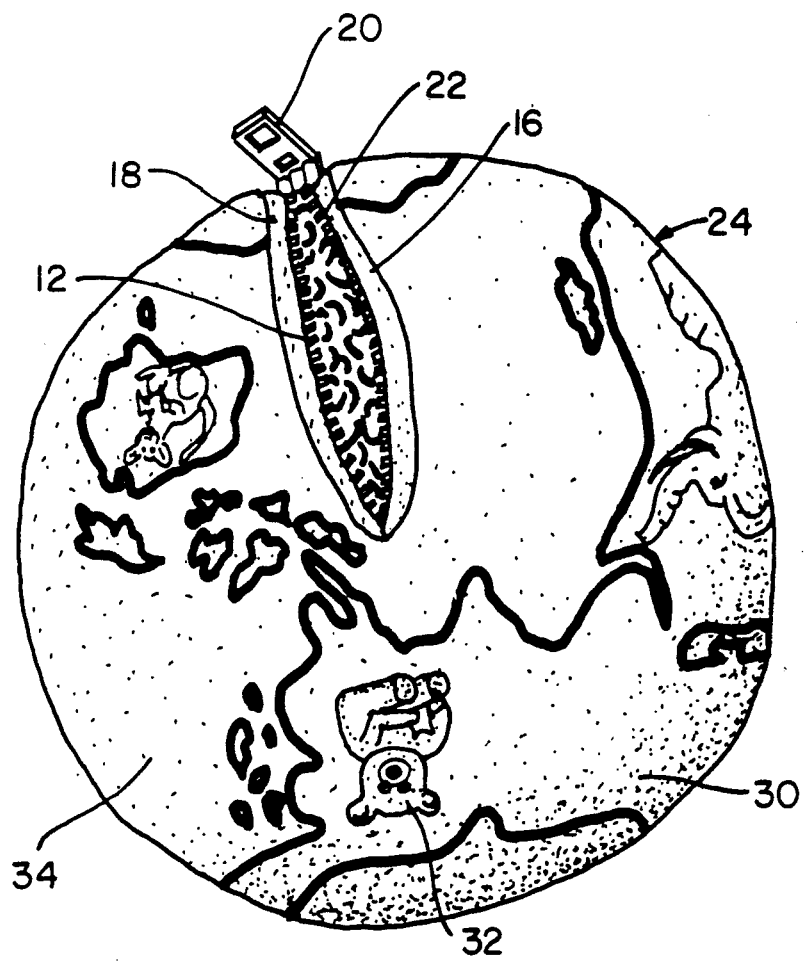
Figure 7:
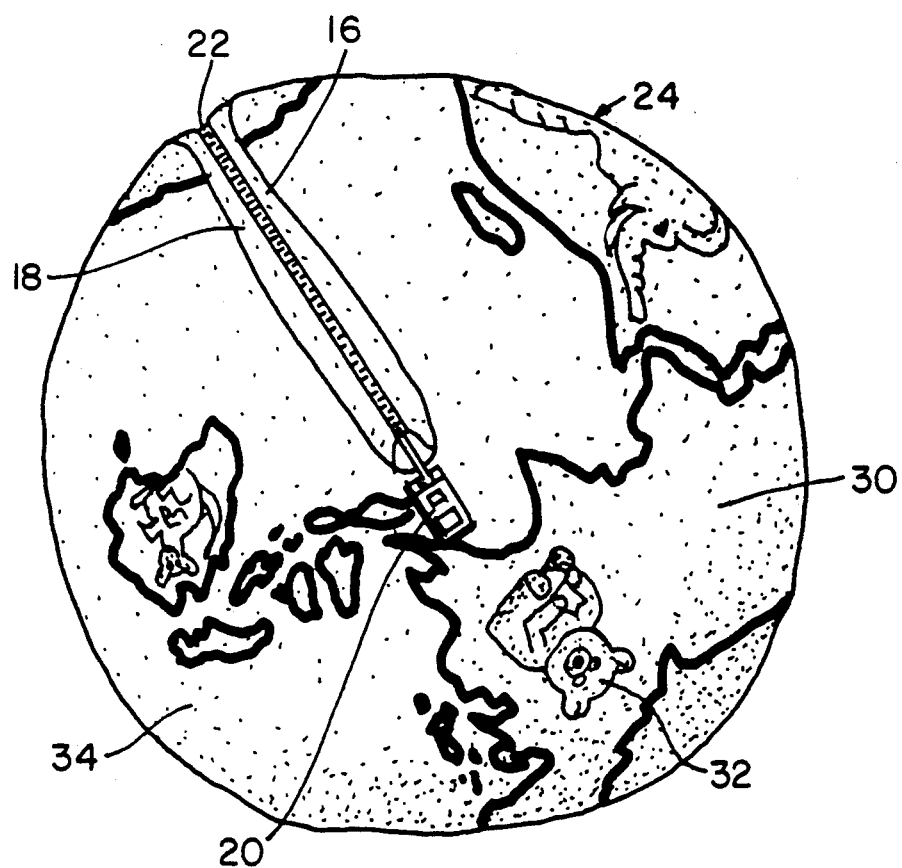
FIG. 7 shows the second shape resulting from use of the invention.

Eventually, the surface material 12 is completely within the internal hollow and surrounded by the second material 24 as shown in FIGS. 6 and 7. Because the material 12 is now in the internal hollow of the object 10, in effect, the surface material 12 supports the new spherical shape that is exposed. There is absolutely no trace to the original animal shape 10. By securing the zipper assembly 20, the surface material 12 is no longer detectable.

The result is a toy object representing the planet Earth. On the surface of the globe is a picture of the land masses 30 and oceans 34 and a likeness of the endangered animal 32 positioned at its natural geographic location. The user may manipulate the materials 12, 24 to move between the first and second shapes an infinite amount of times.

The alterable object in the form of a toy, for example, provides an entertaining diversion for a child. The toy not only helps in strengthening the child's dexterity, but also is an educational toy which teaches the child the geography of the world and its diversity of wildlife, both common and endangered.

It will be understood that the embodiment described herein is merely exemplary and that a person skilled in the art may make many variations and modifications without departing from the spirit and scope of the invention. All such modifications are intended to be included within the scope of the invention as defined in the appended claims.

I claim:

1. An object that can be altered from an animal shape into a globe shape and vice versa, comprising:
   a first material that is pliable and is formed in said animal shape having an internal hollow;
   an aperture formed in said first material such that said aperture provides access to said internal hollow of said animal shape; and
   a second material that is pliable and is formed to assume a globe shape, said second material being positioned within said internal hollow and being connected to said first material within said internal hollow such that said first and second materials employ said aperture, and such that said second material is extractable from said internal hollow through said aperture, whereby upon extraction of said second material from said internal hollow said second material can assume said globe shape, and said first material can be inserted through said aperture into said internal hollow such that said animal shape collapses and is no longer detectable, said globe shape having an indicia formed thereon manifesting major land and water masses of earth and a likeness of said animal shape formed at a geographic position on said earth where the animal represented by said animal shape is found.

2. An object according to claim 1, wherein said globe shape is similarly alterable to assume said animal shape and wherein said device can be altered indefinitely between said animal and globe shapes.

3. An object according to claim 1, wherein said first and second materials are cloth-like.

4. An object according to claim 1, further comprising closing means arranged at said aperture for closing said aperture.

5. An object according to claim 4, wherein said closing means is a zipper assembly.

6. An object according to claim 1, wherein said second material has a surface with a chosen pattern formed thereon, said chosen pattern manifesting a likeness of said animal shape.

7. An object according to claim 1 wherein said first material of said animal shape has a plush texture and said second material of said globe shape has a texture less plush than said first material.

8. A toy object formed in a first predetermined shape and capable of being manipulated to assume a second predetermined shape and vice versa, comprising:
   a first material, said first material being cloth-like and pliable and formed in a first shape resembling an animal, said first shape having an internal hollow;
   an aperture formed in said first material such that said aperture provides access to said internal hollow of said first shape;
   a second material, said second material being cloth-like and pliable and formed in a second shape resembling Earth, said second material being positioned within said internal hollow and being connected to said first material within said internal hollow such that said first and second materials employ said aperture, and such that said second material is extractable from said internal hollow through said aperture, whereby upon extraction of said second material from said internal hollow said second material can assume said second shape, and said first material can be inserted through said aperture into said internal hollow such that said first shape collapses and is no longer detectable, said second material having an indicia formed thereon manifesting major land and water masses of Earth and a likeness of said first shape formed at a geographic position on said Earth where the animal represented by said first shape is found.

9. A toy object according to claim 8, wherein said first material of said first predetermined shape has a plush texture and said second material of said second predetermined shape has a texture less plush than sad first material.

* * * * *